United States Patent [19]

Haviv

[11] Patent Number: 5,070,749
[45] Date of Patent: Dec. 10, 1991

[54] TOOL FOR USE IN LOOSENING OR TIGHTENING VEHICLE WHEEL FASTENERS

[76] Inventor: Yehuda Haviv, 36 Nahalat Yitzhak St., 67 448 Tel Aviv, Israel

[21] Appl. No.: 599,962
[22] Filed: Oct. 19, 1990
[51] Int. Cl.⁵ ............................................. B25B 17/00
[52] U.S. Cl. ...................................... 81/57; 81/57.39; 81/57.29; 81/57.46; 81/57.25
[58] Field of Search ...................... 81/57, 47.29, 57.25, 81/57.24, 57.13, 57.46, 57.22, 57.39

[56] References Cited
U.S. PATENT DOCUMENTS

| | | | |
|---|---|---|---|
| 665,281 | 1/1901 | Stevenson | 81/57.22 |
| 2,836,090 | 5/1958 | Ray | 81/57.46 |
| 3,730,027 | 5/1973 | Rohn | 81/180 |

Primary Examiner—James G. Smith
Assistant Examiner—Lawrence Cruz
Attorney, Agent, or Firm—Benjamin J. Barish

[57] ABSTRACT

A tool for loosening or tightening threaded fasteners on vehicle wheels includes an elongated base member having one end engageable with the ground for anchoring it, and an applicator bar rotatably mounted at the opposite end and carrying a connector for receiving the fastener to be loosened or tightened. The applicator bar and connector are rotated by a ratchet wheel and a pawl driven by a handle pivotally mounted to the base member. The pawl is driven by the handle via a power-boosting fluid cylinder and piston.

20 Claims, 4 Drawing Sheets

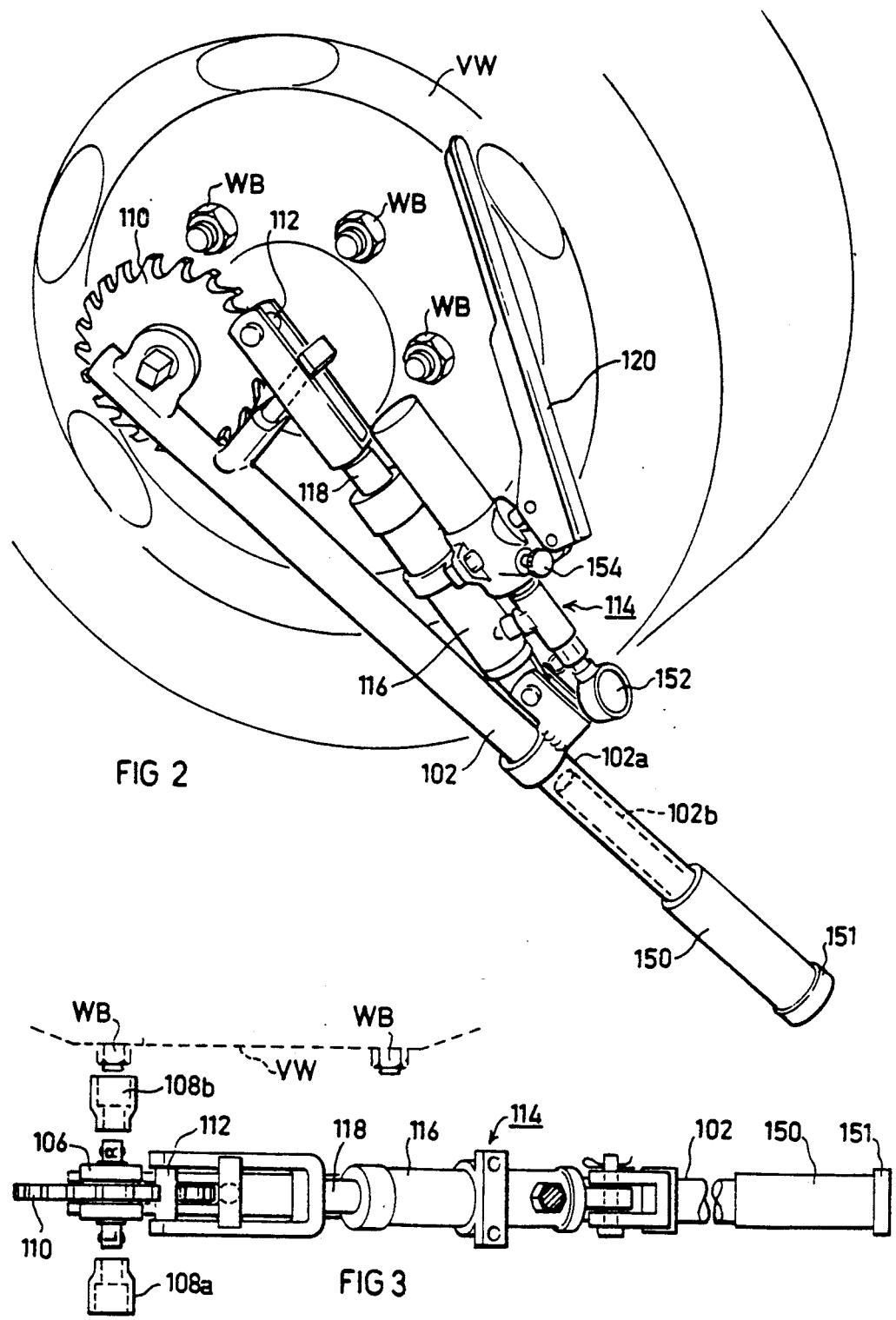

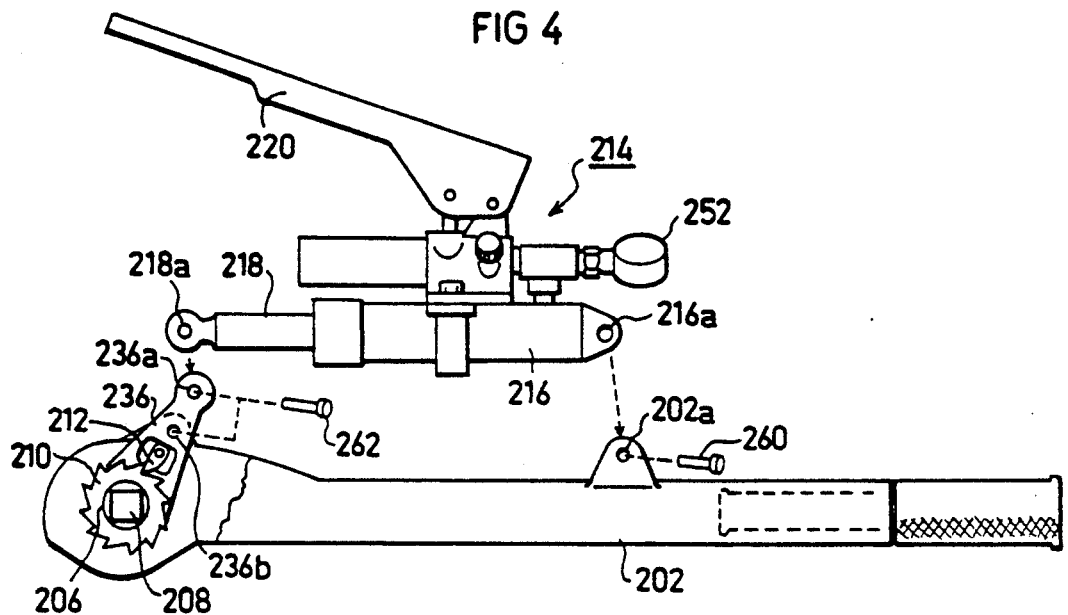
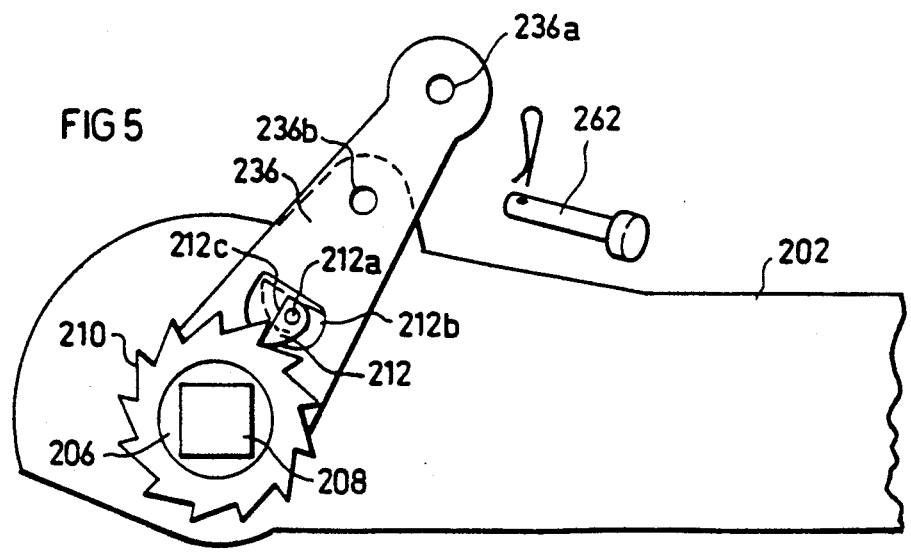

TOOL FOR USE IN LOOSENING OR TIGHTENING VEHICLE WHEEL FASTENERS

RELATED APPLICATIONS

The present application is related to my application Ser. No. 07/393,741 filed Aug. 15, 1989, now patented, which is a continuation-in-part of application Ser. No. 07/239,729 filed Sept. 2, 1988, now abandoned.

FIELD AND BACKGROUND OF THE INVENTION

The present invention relates to tools to aid in loosening and/or tightening threaded fasteners. The invention is particularly useful for loosening and/or tightening fasteners of vehicle wheels, and is therefore described below with respect to this application.

Fasteners, such as nuts and bolts, frequently become "frozen" in place, e.g., by rust or settling, such that they are difficult to remove by conventional wrenches or other tools. This problem is particularly troublesome when changing a vehicle wheel whose wheel bolts have not been removed for a long period of time. In such cases, it is frequently necessary to apply an extremely large force to the wheel fastener in order to loosen it and to permit its removal for changing the wheel. This is not always easy or possible with the tools normally available when a tire change is required, particularly by women or older persons.

OBJECTS AND BRIEF SUMMARY OF THE INVENTION

An object of the present invention is to provide a tool to aid in lossening and/or tightening a threaded fastener with respect to an article, and particularly to aid in loosening and/or tightening fasteners on vehicle wheels to permit changing tires.

According to the present invention, there is provided a tool to aid in loosening and/or tightening a threaded fastener with respect to a vehicle wheel, comprising: an elongated base member having one end engageable with the ground for anchoring it with respect to the vehicle wheel; an applicator bar rotatably mounted to the opposite end of the base member about an axis perpendicular to the longitudinal axis of the base member; a connector at one end of the applicator bar for receiving the fastener to be tightened or loosened; a ratchet wheel coupled to the applicator bar for rotating it and the connector about the axis of the applicator bar; a driving pawl engageable with the ratchet wheel for rotating it; and a handle pivotally mounted to the base member and coupled to the pawl for driving the pawl and the ratchet wheel.

Several embodiments of the invention are described below for purposes of example. In some, one end of the elongated base member includes a plate pivotally mounted thereto and engageable with the ground for anchoring the tool to the ground during the use of the tool. In another described embodiment, one end of the elongated base member includes a sleeve non-slidably engageable with the ground during the use of the tool.

According to further features in the described embodiments, the handle is coupled to the driving pawl via a fluid cylinder and piston drivable by the handle.

In a preferred described embodiment, the cylinder includes a pressure gauge for measuring the pressure of the fluid therein, and thereby the torque applied to the connector when the tool is used for loosening or tightening the fastener.

According to a second described embodiment, the pawl is pivotally mounted between the legs of the bail such as to engage and drive the ratchet wheel in one direction when the oil in the cylinder is pressurized by pivoting the handle, but to permit the pawl to ride over the ratchet wheel in the opposite direction when the pressure in the cylinder is released.

A further embodiment is described wherein the end of the cylinder opposite to that carrying the pawl is pivotally mounted to the elongated base member by a first pin, and the piston is pivotally mounted to the bail by a second pin, the first and second pins being removable to detach the piston, cylinder and handle from the tool, and thereby to permit the bail and pawl to be directly coupled to the elongated base member. In this embodiment, base member and bail are formed with a first pair of alignable openings, and with a second pair of alignable openings closer to the axis of rotation of the ratchet wheel than the first pair of alignable openings. The second pin is receivable in the first pair of alignable openings when the piston, cylinder and handle are attached to the tool, and in the second pair of alignable openings when the piston, cylinder and handle are detached from the tool.

A tool constructed in accordance with the foregoing features may be conveniently used for loosening and/or tightening threaded fasteners of vehicle wheels whenever necessary to change a vehicle tire.

Further features and advantages of the invention will be apparent from the description below.

BRIEF DESCRIPTION OF THE DRAWINGS

The invention is herein described, by way of example only, with reference to the accompanying drawings, wherein:

FIG. 2 illustrates another tool constructed in accordance with the invention and the manner of using the tool for loosening or tightening vehicle wheel fasteners;

FIG. 3 is a top plan view of the tool of FIG. 2;

FIG. 4 is a side elevational view illustrating a modification in the tool of FIGS. 2 and 3 to permit the hydraulic cylinder assembly to be removed if not needed;

FIG. 5 illustrates a variation in the construction of the driving pawl; and

DESCRIPTION OF PREFERRED EMBODIMENTS

Figure 1:
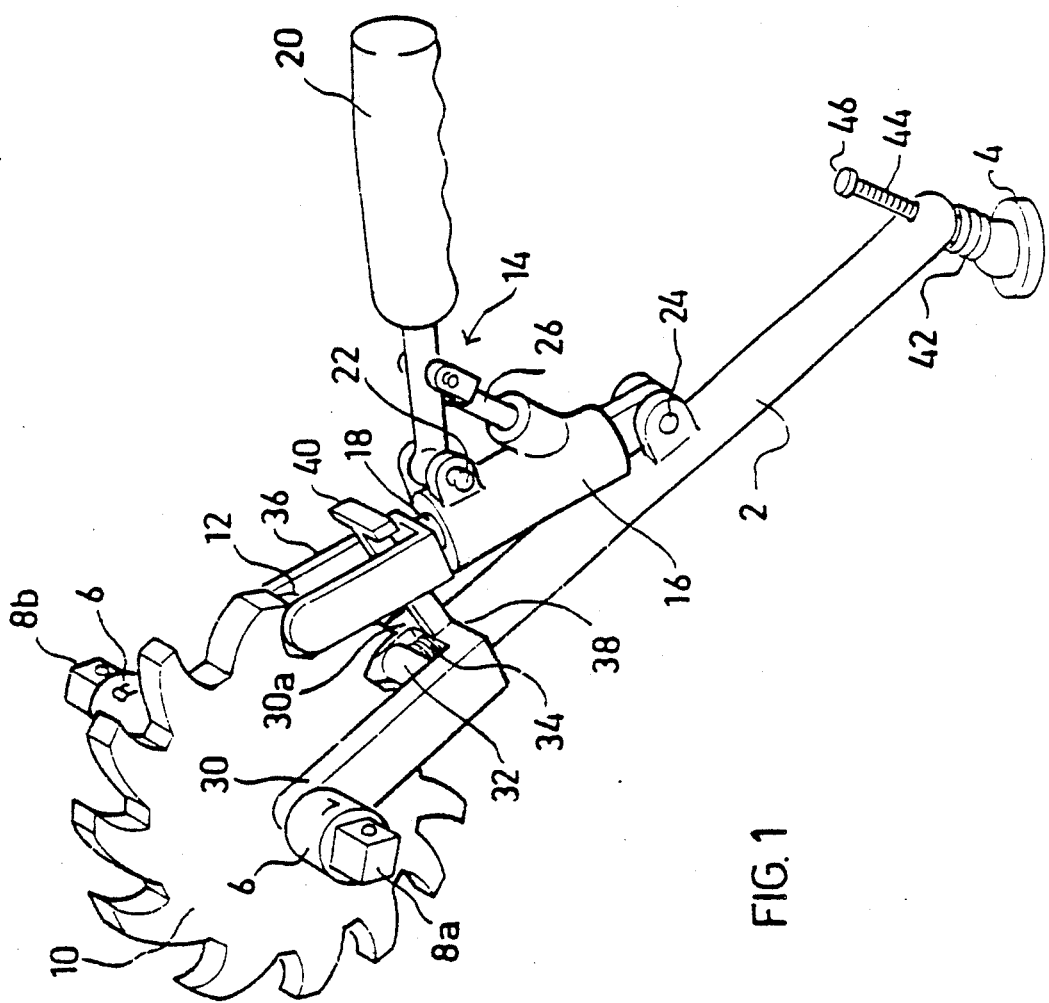
FIG. 1 illustrates one form of tool constructed in accordance with the present invention.

The tool illustrated in FIG. 1 is intended to aid in loosening and/or tightening a wheel bolt WB (FIG. 2) on a vehicle wheel VW. The illustrated tool comprises an elongated base member, generally designated 2, having a ground-engaging anchor plate 4 at one end for anchoring the tool to the ground during the use of the tool, and an applicator bar 6 rotatably mounted to the opposite end of base member 2 about an axis perpendicular to the longitudinal axis of the base member. Applicator bar 6 carries a pair of connectors 8a, 8b at its opposite ends for receiving the fastener to be loosened or tightened. The applicator bar 6 is rotated by a ratchet wheel 10 fixed to the applicator bar and rotated by a driving pawl 12.

Pawl 12 is driven by a hydraulic cylinder assembly 14 which includes a cylinder 16, a piston 18, and a handle 20 pivotally mounted to the cylinder by pin 22 for driving the piston 18 and its pawl 12. Cylinder 16 is pivotally mounted to base member 2 by a pin 24. Handle 20 is pivotally coupled to a plunger 26. Pivoting the handle thus pumps the hydraulic fluid within cylinder 16 to force piston 18 outwardly, and thereby to cause pawl 12 to rotate ratchet wheel 10 and its applicator bar 6 about the axis of the applicator bar. Connector 8a at one end of the applicator bar is used to rotate the wheel fastener in the direction to loosen it, whereas connector 8b is used to rotate the fastener in the opposite direction, to tighten it.

The ratchet wheel 10 and its applicator bar 6 are rotatably mounted by a bail 30 having a pair of parallel legs straddling the opposite sides of the ratchet wheel. The intermediate leg 30a of bail 30 carries a second pawl 32 urged by a spring 34 into the space between the teeth of the sprocket wheel 10 for locking the sprocket wheel against rotation. This arrangement also enables the hydraulic cylinder assembly 14, including its pawl 12, to be removed, in which case pawl 32 would be used for rotating the ratchet wheel 10.

The driving pawl 12 is secured between the legs of another bail 36 also straddling the ratchet wheel 10. The intermediate connecting leg of bail 36 is fixed to piston 18 of the hydraulic assembly 14.

An upright arm 38 secured to leg 30a of bail 30 passes between the parallel legs of bail 36 and terminates at its outer tip with a horizontal formation 40. Arm 38 guides the movements of bail 36 and its pawl 12 when the pawl rotates ratchet wheel 10, its applicator bar 6, and the connectors 8a, 8b secured to its opposite ends.

The ground-engaging anchor plate 4 is pivotally mounted by a spring 42 to the outer end of base member 2. Spring 42 is compressed in proportion to the force applied by the base member 2 to the fasteners engaged by one of the connectors 8a, 8b. This force is indicated by graduation markings 44 on a pin 46 serving as a torque meter.

The manner of using the tool illustrated in FIG. 1 will be apparent from the above description. Thus, if the wheel fastener is to be loosened, connector 8a at one end of base member 2 is applied to the fastener; and if the fastener is to be tightened, connector 8b is applied to it. Plate 4 at the opposite end of base member 2 firmly rests on the ground so as to anchor the tool against movement as handle 20 is manually pivoted to pump the oil within cylinder 16 to project its piston 18, and thereby to cause its pawl 12 to drive ratchet wheel 10 counter-clockwise in the direction illustrated in FIG. 1, thereby to loosen (or tighten) the wheel fastener. It will thus be seen that the tool illustrated in FIG. 1 enables a very large force to be applied to loosen or tighten the fastener.

The tool illustrated in FIGS. 2 and 3 similarly includes an elongated base member 102 rotatably mounting at one end, an applicator bar 106 carrying a pair of connectors 108a, 108b for engaging the wheel fastener WB of the vehicle wheel VW. Applicator bar 106 is similarly rotated by a sprocket wheel 110 and a pawl 112 driven by a hydraulic cylinder assembly 114 including a cylinder 116, a piston 118, and a handle 120.

In the construction illustrated in FIGS. 2 and 3, however, the anchoring of the tool to the ground during its use is effected by a plastic or rubber sleeve 150 enclosing the outer end of the elongated base member 102 and non-slidably engageable with the ground. For this purpose, the lower end of sleeve 150 may have a metal collar 151 engageable with the ground. In addition, the force applied to loosen or tighten the fastener is indicated by a pressure gauge 152 carried by the hydraulic cylinder assembly 114. Gauge 152 measures the pressure of the oil within the cylinder moving the piston 118 outwardly of the cylinder. This oil pressure is in turn a measure of the force which is exerted by pawl 112 to rotate ratchet wheel 110, and thereby the connectors 108a, 108b carried at the opposite ends of the applicator bar 106.

A further modification in the tool illustrated in FIGS. 2 and 3 is that the hydraulic cylinder assembly 114 includes a pressure-release pin 154 which, when manipulated, releases the pressure within cylinder 116. The hydraulic cylinder assembly 116 is of the type which includes a spring (not shown) effective to retract the piston 118 within the cylinder when the oil pressure is thus released.

According to a still further modification, the base member 102 is constituted of two telescoping sections 102a, 102b, enabling its length to be fixed for any particular application.

In all other respects, the construction and operation of the tool illustrated in FIGS. 2 and 3 are substantially the same as described above with respect to FIG. 1.

FIG. 4 illustrates a modification in the construction of the tool of FIGS. 2 and 3. In this modification, the hydraulic cylinder assembly 214, including its cylinder 216, piston 218, handle 220, and pressure gauge 252, may be removed by removing a pin 260 pivotally mounting the hydraulic cylinder assembly 216 to the base member 202 via openings 216a, 202a, respectively, and second a pin 262 pivotally mounting the piston 218 to the bail 23 carrying the pawl 212 driving the ratchet wheel 210 and the connectors 208 at the opposite ends of the applicator bar 206.

For this purpose, piston 218 of the hydraulic cylinder assembly 214 is formed with an opening 218a alignable with either a pair of openings 236a at the outer end of bail 236, or a pair of openings 236b located closer to the ratchet wheel 210. Thus, when it is desired to use the hydraulic cylinder assembly 214 in order to enable a high rotational force to be applied to the fastener to be loosened or tightened, pin 260 would be received into the aligned openings 202a and 216a to pivotally mount one end of the hydraulic cylinder assembly 214, and pin 262 would be inserted into the aligned openings 218a and 236a to pivotally couple the bail 236 and its drive pawl 212 to the piston 218 of the hydraulic assembly. The tool would then be used in the same manner as described above with respect to FIGS. 1–3.

However, when it is desired to remove the hydraulic cylinder assembly 214 because the added power is not necessary, pin 260 is removed, and pin 262 is removed from openings 218a, 236a, and is applied instead to openings 218a and 236b in order to pivotally mount the bail 236 carrying the pawl 212 to the respective end of the base member 202. In this simplified form of the tool, base member 202 is manipulated in a similar manner as a hand wrench in order to loosen or tighten the fastener received within one of the connectors 208 at the opposite ends of the applicator bar 206.

The drive pawl 212 included in the tool illustrated in FIGS. 4 and 5 is pivotally mounted about a pin 212a and is configured to have a curved face 212b and a flat face 212c, as shown particularly in FIG. 5. The arrangement is such that when the bail 236 is pivoted in one direction, the flat face 212c of pawl 212 drives the ratchet wheel 210, and thereby the connectors 208 carried at the end of its applicator bar 206; whereas when the bail is pivoted in the opposite direction, the curved face 212b of the pawl causes it to pivot about its pin 212a, as shown in the broken line in FIG. 5, in order to permit the pawl to ride over the ratchet teeth.

Figure 6:
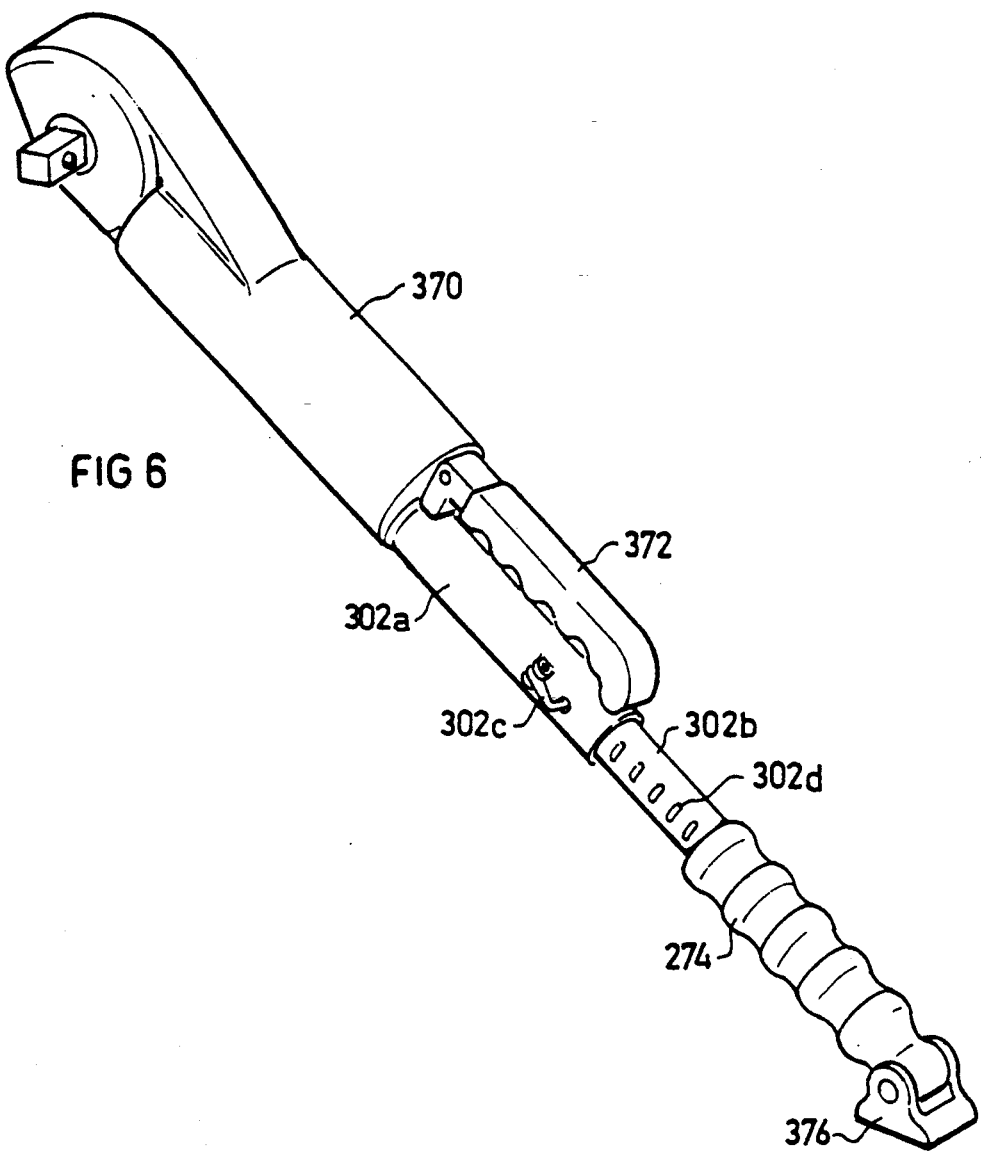
FIG. 6 pictorially illustrates a further tool constructed in accordance with the present invention.

FIG. 6 illustrates a tool similar to those described above, except that the hydraulic cylinder, piston, driving pawl and ratchet wheel are all enclosed within a common housing 370 to present a neat outer appearance to the tool. The handle 372 of the hydraulic cylinder assembly is pivotally mounted to the elongated base member 302 at one side of housing 370 and is coupled to the elements enclosed within housing 370 such that manually pivoting handle 372 applies power to project the piston and to rotate the applicator bar and connectors 308 at its opposite ends in the same manner as described above.

The outer end of base member 302 pivotally mounts a plate 376 which non-slidably engages the ground, thereby anchoring the tool to the ground during use of the tool. The outer end of base member 302 may also include a plastic or rubber sleeve 374. In addition, the base member 302 is made of two telescoping sections 302a, 302b to permit adjustment of its length for any particular application. The two sections are fixed in position by a pin 302c passing through section 302a and receivable within a selected recess 302d in section 302b.

While the invention has been described with respect to several preferred embodiments, it will be appreciated that many other variations, modifications and applications of the invention may be made.

What is claimed is:

1. A tool to aid in loosening and/or tightening a threaded fastener with respect to a vehicle wheel, comprising:
   an elongated base member having one end engageable with the ground for anchoring it with respect to the vehicle wheel;
   an applicator bar rotatably mounted to the opposite end of the base member about an axis perpendicular to the longitudinal axis of the base member;
   a connector at one end of the applicator bar for receiving the fastener to be tightened or loosened;
   a ratchet wheel coupled to the applicator bar for rotating it and the connector about the axis of the applicator bar;
   a driving pawl engageable with said ratchet wheel for rotating it;
   and a handle pivotally mounted to the base member and coupled to said pawl for driving the pawl and the ratchet wheel.

2. The tool according to claim 1, wherein said one end of the elongated base member includes a plate pivotally mounted thereto and engageable with the ground for anchoring the tool to the ground during the use of the tool.

3. The tool according to claim 1, wherein one end of the elongated base member includes a sleeve non-slidably engageable with the ground during the use of the tool.

4. The tool according to claim 1, wherein said handle is coupled to the driving pawl via a fluid cylinder and piston drivable by said pivotally mounted handle.

5. The tool according to claim 4, wherein said fluid cylinder includes a pressure gauge for measuring the pressure of the fluid therein, and thereby the torque applied to said connector when the tool is used for loosening or tightening the fastener.

6. The tool according to claim 1, wherein said pawl is mounted to the piston by a bail having a pair of legs carrying the pawl between them and straddling the opposite faces of the ratchet wheel.

7. The tool according to claim 6, wherein said pawl is pivotally mounted between the legs of said bail such as to engage and drive the ratchet wheel in one direction when the oil in the cylinder is pressurized by pivoting the handle, but to permit the pawl to ride over the ratchet wheel in the opposite direction when the pressure in the cylinder is released.

8. The tool according to claim 6, wherein the end of said cylinder opposite to that carrying the pawl is pivotally mounted to the elongated base member by a first pin, and said piston is pivotally mounted to the bail by a second pin, said first and second pins being removable to detach said piston, cylinder and handle from the tool, and thereby to permit the bail and pawl to be directly coupled to the elongated base member.

9. The tool according to claim 8, wherein said elongated base member and bail are formed with a first pair of alignable openings, and with a second pair of alignable openings closer to the axis of rotation of the ratchet wheel than said first pair of alignable openings; said second pin being receivable in said first pair of alignable openings when said piston, cylinder and handle are attached to the tool, and in said second pair of alignable openings when said piston, cylinder and handle are detached from the tool.

10. The tool according to claim 4, wherein said cylinder piston, pawl and ratchet wheel are all enclosed within a common housing.

11. The tool according to claim 1, wherein said elongated base member includes two telescoping sections enabling its length to be varied.

12. The tool according to claim 1, wherein a second connector is provided at the opposite end of the applicator bar is said first connector for receiving a fastener to be tightened or loosened.

13. A tool to aid in loosening and/or tightening a threaded fastener with respect to a vehicle wheel, comprising:
   an elongated base member having one end engageable with the ground and including two telescoping sections enabling its length to be varied;
   an applicator are rotatably mounted to the opposite end of the base member about an axis perpendicular to the longitudinal axis of the base member,
   a connector at one end of the applicator bar for receiving the fastener to be tightened or loosened;
   a ratchet wheel coupled to the applicator bar for rotating it and the connector about the axis of the applicator bar;
   a driving pawl engageable with said ratchet wheel for rotating it;
   and a handle pivotally mounted to the base member and coupled to said pawl for driving the pawl and the ratchet wheel.

14. The tool according to claim 13, wherein said handle is coupled to the driving pawl via a fluid cylinder and piston drivable by said pivotally mounted handle.

15. The tool according to claim 14, wherein said fluid cylinder includes a pressure gauge for measuring the pressure of the fluid therein, and thereby the torque applied to said connector when the tool is used for loosening or tightening the fastener.

16. The tool according to claim 14, wherein said pawl is mounted to the piston by a bail member having a pair of legs carrying the pawl between them and straddling the opposite faces of the ratchet wheel.

17. A tool to aid in loosening and/or tightening a threaded fastener with respect to a vehicle wheel, comprising:
 an elongated base member having one end engageable with the ground for anchoring it with respect to the vehicle wheel;
 an applicator bar rotatably mounted to the opposite end of the base member about an axis perpendicular to the longitudinal axis of the base member;
 a connector at one end of the applicator bar for receiving the fastener to be tightened or loosened;
 a ratchet wheel coupled to the applicator bar for rotating it and the connector about the axis of the applicator bar;
 a driving pawl engageable with said ratchet wheel for rotating it;
 and a handle pivotally mounted to the base member and coupled to said pawl via a fluid cylinder and piston for driving the pawl and the ratchet wheel.

18. The tool according to claim 14, wherein said pawl is mounted to the piston by a bail having a pair of legs carrying the pawl between them and straddling the opposite faces of the ratchet wheel, said pawl being pivotally mounted between the legs of said bail such as to engage and drive the ratchet wheel in one direction when the oil in the cylinder is pressurized by pivoting the handle, but to permit the pawl to ride over the ratchet wheel in the opposite direction when the pressure in the cylinder is released.

19. The tool according to claim 18, wherein the end of said cylinder opposite to that carrying the pawl is pivotally mounted to the elongated base member by a first pin, and said piston is pivotally mounted to the bail by a second pin, said first and second pins being removable to detach said piston, cylinder and handle from the tool, and thereby to permit the bail and pawl to be directly coupled to the elongated base member.

20. The tool according to claim 18, wherein said elongated base member and bail are formed with a first pair of alignable openings, and with a second pair of alignable openings closer to the axis of rotation of the ratchet wheel than said first pair of alignable openings; said second pin being receivable in said first pair of alignable openings when said piston, cylinder and handle are attached to the tool, and in said second pair of alignable openings when said piston, cylinder and handle are detached from the tool.

* * * * *